June 7, 1938.  F. F. NICHOLS  2,119,924
GARDEN CULTIVATOR
Filed July 26, 1937  2 Sheets-Sheet 1
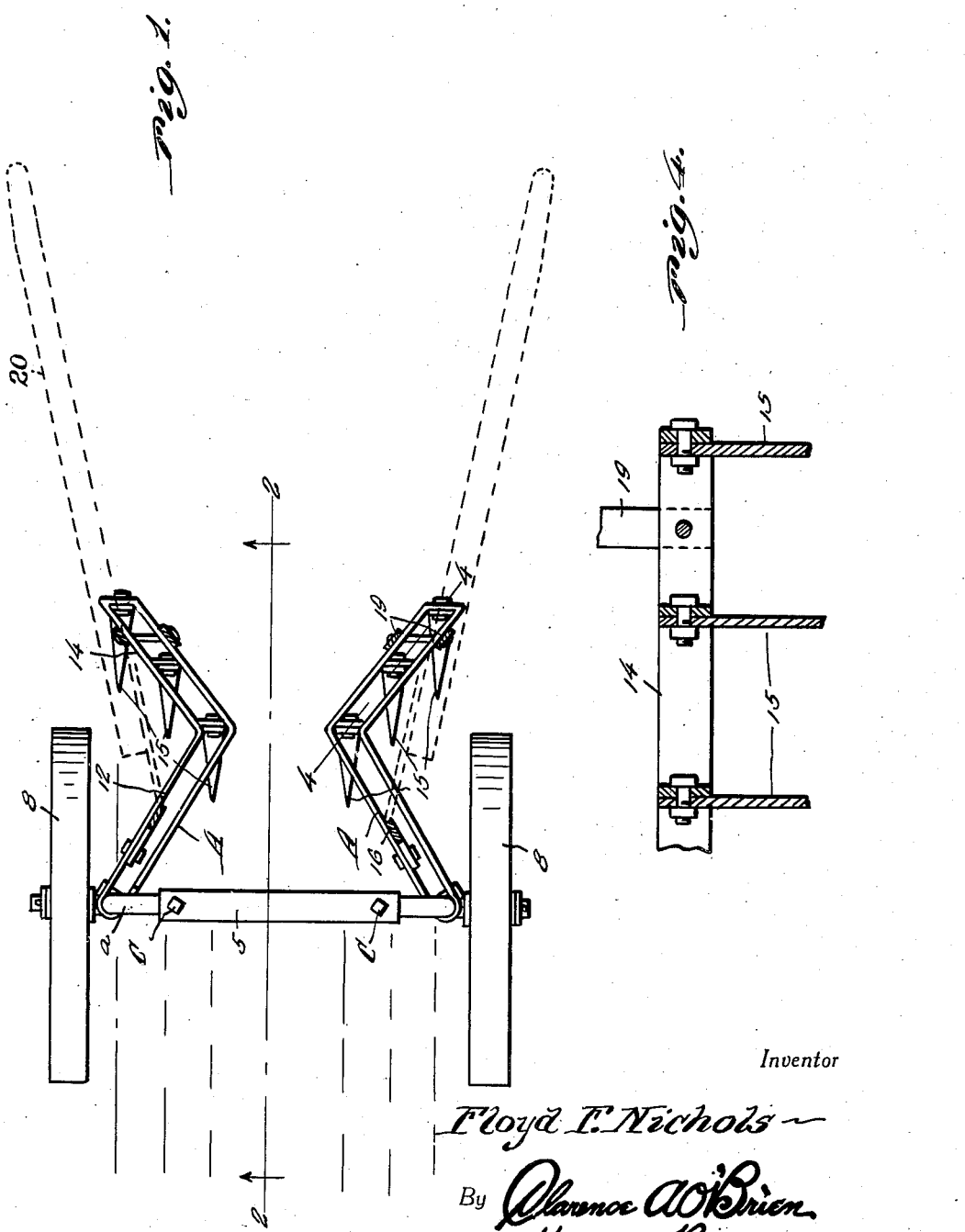
Inventor
Floyd F. Nichols
By Clarence A. O'Brien
Hyman Berman
Attorneys

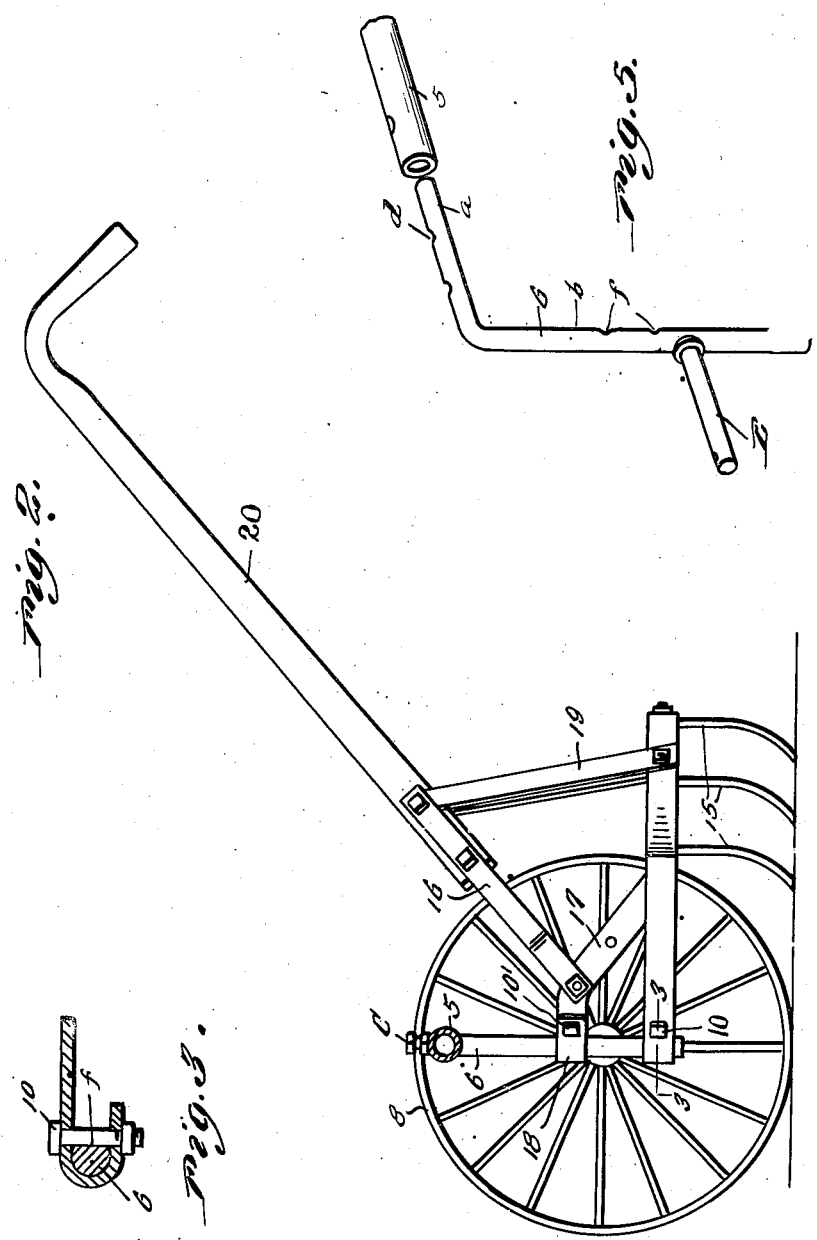

Patented June 7, 1938

2,119,924

UNITED STATES PATENT OFFICE 2,119,924

GARDEN CULTIVATOR

Floyd F. Nichols, David City, Nebr.

Application July 26, 1937, Serial No. 155,763

2 Claims. (Cl. 97—59)

The present invention relates to a device for use in cultivating gardens by means of man power applied to said device.

The object of this invention is to provide a garden cultivator operated by man power that has independent beams which operate on swivel arched axles, one beam is fixed and the other is flexible. Either beam may be flexible or fixed by merely tightening or loosening the bolts that fasten the beams to the axles. The beam that is fixed is used to provide the steering of the garden cultivator during its operation. The flexible beam will allow the person that is cultivating to move the beam to which are fastened the shovels, either near the plant that is being cultivated or further away from the plant depending on what the operator desires. The swivel arched axle will permit the raising of either handle of the cultivator to which is attached the beam and shovels, without the necessity of lifting the other handle of the cultivator and this is advantageous in operation because its permits the operator to remove clogs of hard dirt that may be on one side of the row being cultivated and not on the other, by merely lifting the one side as indicated in the drawings. In a sense this cultivator has knee-action because either wheel can be raised above the level of the ground by the roughness of the ground being cultivated and because of the swivel axle feature of the cultivator the shovels of the cultivator may stay in the ground.

Another important object of the invention resides in the provision of a garden cultivator of this nature which is exceedingly simple in its construction, inexpensive to manufacture, strong and durable, easy to manipulate, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:—

Figure 1 is a top plan view of the cultivator showing the features of my invention, the handles being shown in dotted lines and the straps which connect the handles with other parts of the cultivator being shown in section.

Figure 2 is a vertical section taken substantially on the line 2—2 of Figure 1.

Figure 3 is a detail sectional view on the line 3—3 of Figure 2.

Figure 4 is a detail fragmentary section taken substantially on the line 4—4 of Figure 1.

Figure 5 is a perspective view of one end of the axle assembly.

Referring to the drawings in detail it will be seen that referring to the axle assembly the numeral 5 denotes a sleeve in which fits for limited rocking movement the upper short legs $a$ of substantially L-shaped axle members 6, the longer legs $b$ extending downwardly. The smaller legs $a$ are held in place by set screws C engageable in notches $d$, the longer legs $b$ having pintles E projecting outwardly therefrom on which are rotatably mounted wheels 8.

Arms A are engaged with the portions $b$ and held in place in cooperation with notches $f$ by bolts 10.

Each arm is of a general V-shaped formation in the form of a frame and comprises a single strip of metal bent upon itself to provide an elongated rectangular frame. These frames are bent to provide the rearwardly converging front portion 12 and the rear divergent portions 14, these portions 14 having mounted therein the shovels or blades 15. Handle bars 20 are secured by strap members 16 to V-shaped members 17 the upper ends of which are clamped as at 18 on the portions $b$ by bolts 10' or loose to swing thereon and the other portions of the members 17 are connected to the frames. Braces 19 are connected with the handles and the frames. As stated in the objects of the invention the bolts 10 and 10' may be tightened to fasten the handles and frames securely or to allow one or both of the frames to swing for the purpose explained.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

Having thus described the invention what is claimed as new is:—

1. A cultivator of the class described comprising a sleeve, a pair of substantially L-shaped members each having one leg supported in the sleeve for limited rocking movement, the other leg extending downwardly, outwardly extending spindles carried by said other legs, wheels carried by the spindles, a pair of shovel carrying frames connected to said other legs, a pair of handles and means for connecting each handle to a frame and to the leg to which said frame is connected.

2. A cultivator of the class described comprising a sleeve, a pair of substantially L-shaped members each having one leg held in the sleeve for limited rocking movement, said legs extending from opposite ends of the sleeve, the second leg depending from the first leg, outwardly extending spindles carried by the second legs, wheels on said spindles, a pair of shovel carrying frames having their front ends clamped to said second legs, said frames having the front parts converging rearwardly and their rear portions diverging, shovels carried by the diverging parts, a brace member having one end connected to each frame and its other end clamped to the second leg to which the frame is clamped, whereby by loosening the clamps said frame and the brace member can be swung toward and away from the other frame, a pair of handles, means for connecting the lower end of each handle to a brace member and a brace member connecting each handle to the rear part of a frame.

FLOYD F. NICHOLS.